US009450626B2

(12) United States Patent
Choksi et al.

(10) Patent No.: US 9,450,626 B2
(45) Date of Patent: Sep. 20, 2016

(54) SAWLESS ARCHITECTURE FOR RECEIVERS

(71) Applicant: QUALCOMM Incorporated, San Diego, CA (US)

(72) Inventors: Ojas Mahendra Choksi, San Diego, CA (US); Bin Fan, San Diego, CA (US); Bassel Hanafi, San Diego, CA (US); Hasnain Mohammedi Lakdawala, San Diego, CA (US); Prashanth Akula, San Diego, CA (US); Faramarz Sabouri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/643,498

(22) Filed: Mar. 10, 2015

(65) Prior Publication Data

US 2016/0142085 A1 May 19, 2016

Related U.S. Application Data

(60) Provisional application No. 62/080,199, filed on Nov. 14, 2014.

(51) Int. Cl.
*H04L 27/06* (2006.01)
*H04B 1/16* (2006.01)
*H04B 1/10* (2006.01)
*H04B 1/04* (2006.01)

(52) U.S. Cl.
CPC .............. *H04B 1/16* (2013.01); *H04B 1/1018* (2013.01); *H04B 1/1027* (2013.01); *H04B 1/1638* (2013.01); *H04B 2001/0416* (2013.01)

(58) Field of Classification Search
CPC . H03F 2200/294; H03F 3/211; H03F 1/3211
USPC ...... 330/124 R, 295; 375/295, 340; 455/293, 455/311, 341; 327/359
See application file for complete search history.

(56) References Cited

U.S. PATENT DOCUMENTS

| 5,345,119 A * | 9/1994 | Khoury .............. G11B 5/59622 327/553 |
| 6,784,731 B2 * | 8/2004 | Zhang .................. H03F 1/3247 330/107 |
| 8,433,272 B2 | 4/2013 | Gudem et al. |
| 8,521,198 B2 | 8/2013 | Ciccarelli et al. |
| 8,644,197 B2 | 2/2014 | Lee et al. |
| 2005/0164669 A1 | 7/2005 | Molnar et al. |
| 2008/0186106 A1 | 8/2008 | Christian et al. |
| 2009/0111420 A1 | 4/2009 | Tasic et al. |
| 2009/0258624 A1 * | 10/2009 | Gudem .................. H04B 1/109 455/234.1 |
| 2011/0299580 A1 * | 12/2011 | Sornin ................ H04B 1/1036 375/224 |
| 2012/0057621 A1 | 3/2012 | Hong et al. |
| 2013/0314160 A1 | 11/2013 | Tsai et al. |

OTHER PUBLICATIONS

International Search Report and Written Opinion—PCT/US2015/054273—ISA/EPO—Dec. 23, 2015.
Borremans J., et al., "A 40 nm CMOS 0.4-6 GHz Receiver Resilient to Out-of-Band Blockers", IEEE Journal of Solid-State Circuits, Jul. 2011, vol. 46, No. 7, pp. 1659-1671.
Mirzaei A., et al., "A 65 nm CMOS Quad-Band SAW-Less Receiver SoC for GSM/GPRS/EDGE", IEEE Journal of Solid-State Circuits, Apr. 2011, vol. 46, No. 4, pp. 950-964.
Yu C-Y., et al., "A SAW-Less GSM/GPRS/EDGE Receiver Embedded in 65-nm SoC", IEEE Journal of Solid-State Circuits, Dec. 2011, vol. 46, No. 12, pp. 3047-3060.

* cited by examiner

*Primary Examiner* — Leila Malek
(74) *Attorney, Agent, or Firm* — Procopio, Cory, Hargreaves & Savitch, LLP

(57) ABSTRACT

An apparatus including: at least one differential amplifier configured to amplify a radio frequency signal; a mixer configured to mix the radio frequency signal from the at least one differential amplifier with a local oscillator signal; and a low-pass filter coupled to the mixer, the low-pass filter includes a capacitor and at least one variable resistor configured to tune the low-pass filter.

21 Claims, 6 Drawing Sheets

US 9,450,626 B2

SAWLESS ARCHITECTURE FOR RECEIVERS

CROSS-REFERENCE TO RELATED APPLICATIONS

This application claims the benefit of priority under 35 U.S.C. §119(e) of U.S. Provisional Patent Application No. 62/080,199, filed Nov. 14, 2014, entitled "Sawless Architecture for Receivers." The disclosure of the above-referenced application is incorporated herein by reference.

BACKGROUND

1. Field

This invention relates generally to receivers, and more specifically, to combining different signal paths and reusing a SAW-less receiver circuit with a SAW receiver operation on a same pin.

2. Background

In a full duplex, frequency division duplex (FD-FDD) system, the receiver and transmitter operate simultaneously on different frequencies, which provide the necessary separation between uplink and downlink signal paths. However, current radio frequency (RF) front-end (FE) design for an FDD long-term evolution (LTE) and carrier aggregation (CA) transceiver is very complex. For example, each band of the full duplex systems such as Wideband Code Division Multiple Access (WCDMA) require receive/transmit (Rx/Tx) surface acoustic wave (SAW) filters or duplexers to avoid being jammed by the transmit power leakage into the receiver. In half-duplex systems such as Global System for Mobile communications (GSM) Time Division Synchronous CDMA (TDS-CDMA), and Time Division Long-Term Evolution (TD-LTE), an Rx SAW filter is required to avoid being jammed or de-sensed by out-of-band blockers as high as 0 dBm. Thus, in half-duplex systems, several techniques are employed to substantially reduce the need for the Rx SAW filter due to the absence of a concurrent operation of the transmitter. However, the removal of the Rx SAW filter causes the out-of-band (OOB) jammers with high input level to be present at the input of the low noise amplifier (LNA).

BRIEF DESCRIPTION OF THE DRAWINGS

The details of the present disclosure, both as to its structure and operation, may be gleaned in part by study of the appended further drawings, in which like reference numerals refer to like parts, and in which.

DETAILED DESCRIPTION

Accordingly, in designing, for example, a GSM SAW-less receiver (Rx), designers face several challenges including requirements for high LNA linearity specifications (e.g., OOB second-order input intercept point (IIP2) and OOB third order input intercept point (IIP3)), high mixer IIP2 specifications, and tough receiver local oscillator (LO) harmonics rejection specifications. The removal of the SAW filter also increases the dynamic range requirement up to 110 dB and the need for the receiver to tolerate very large OOB interferers, which requires very high OOB linearity and 1-dB compression point (P1 dB) while meeting good sensitivity. This poses stringent requirements on the LNA and the mixer to meet very high OOB IIP3 and high OOB IIP2 Tx. Further, a large blocker can down-convert the LO phase noise through convolution and increase the noise figure (NF). The SAW-less receiver can also downconvert jammers at the harmonics of a local oscillator frequency (n*fLO) which would require high input rejection at LO harmonics.

Certain embodiments as described herein provide for combining several different signal paths and reuse and/or share a GSM SAW-less receiver front-end (RxFE) circuit with a SAW receiver operation on the same pin. The "SAW" receiver refers to a receiver which requires an external filter such as a SAW filter to prevent LNA desensitization, while the "SAW-less" receiver is a receiver which requires no external SAW filter at LNA input and can tolerate high OOB blockers.

Figure 1:
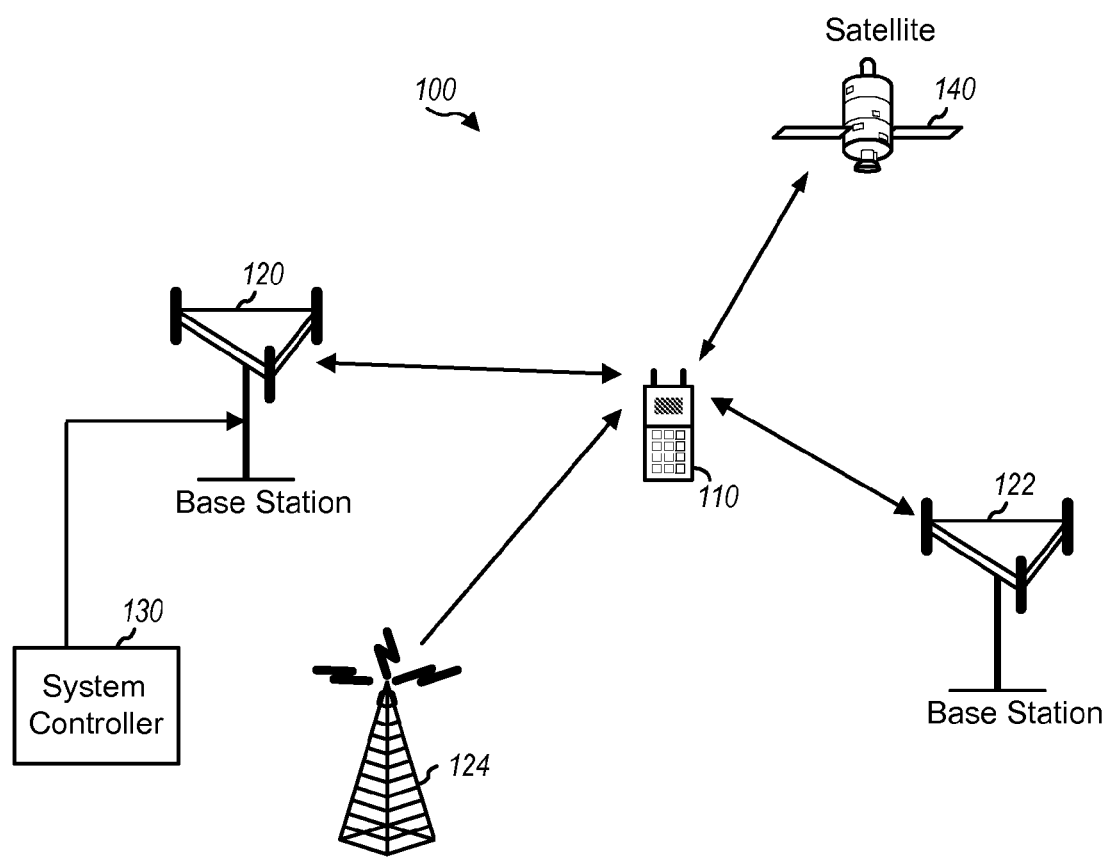
FIG. 1 is an exemplary wireless device communicating with a wireless communication system.

FIG. 1 is an exemplary wireless device 110 communicating with a wireless communication system 100. Wireless communication system 100 may be a Long Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1x, Evolution-Data Optimized (EVDO), Time Division Synchronous CDMA (TD-SCDMA), or some other version of CDMA. For simplicity, FIG. 1 shows wireless system 100 including two base stations 120 and 122 and one system controller 130. In general, a wireless system may include any number of base stations and any set of network entities.

Wireless device 110 may also be referred to as a user equipment (UE), a mobile station, a terminal, an access terminal, a subscriber unit, a station, etc. Wireless device 110 may be a cellular phone, a smartphone, a tablet, a wireless modem, a personal digital assistant (PDA), a handheld device, a laptop computer, a smartbook, a netbook, a cordless phone, a wireless local loop (WLL) station, a Bluetooth device, etc. Wireless device 110 may communicate with wireless system 100. Wireless device 110 may also receive signals from broadcast stations (e.g., a broadcast station 124), signals from satellites (e.g., a satellite 140) in one or more global navigation satellite systems (GNSS), etc. Wireless device 110 may support one or more radio technologies for wireless communication such as LTE, WCDMA, CDMA 1x, EVDO, TD-SCDMA, GSM, 802.11, etc.

Figure 2:
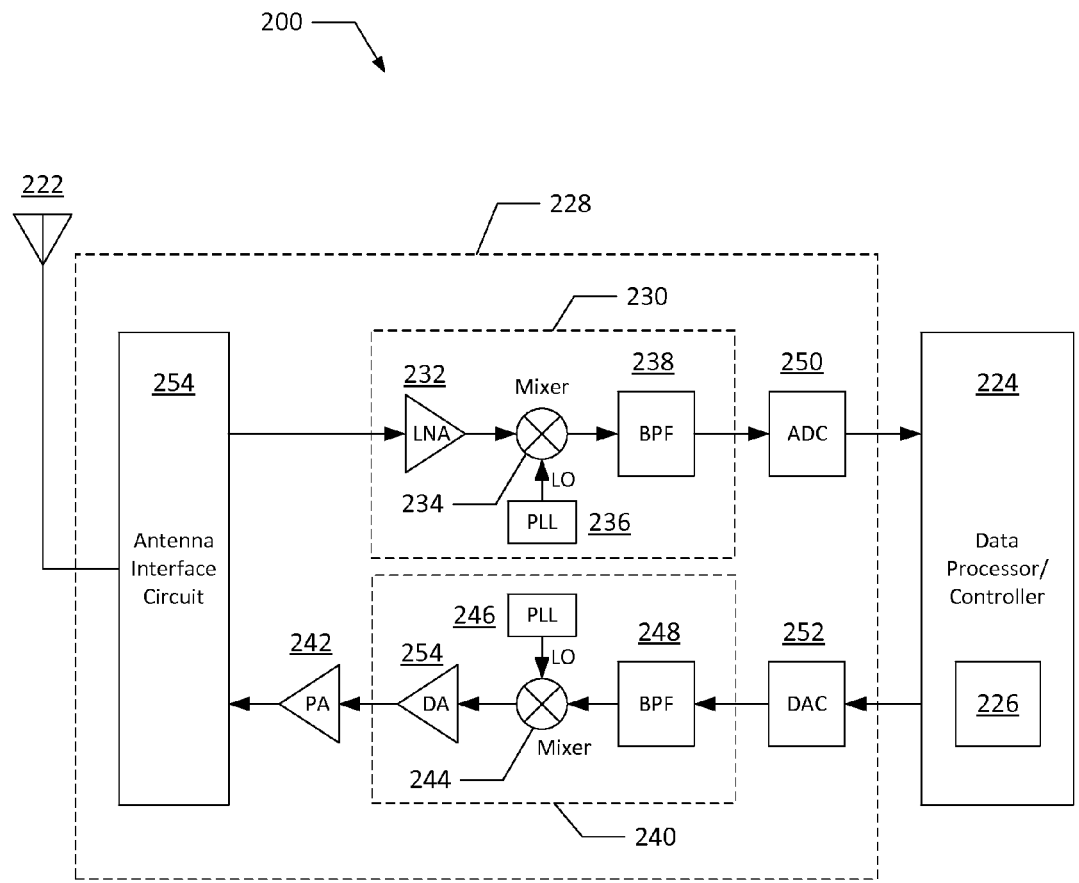
FIG. 2 is a block diagram of an exemplary design of a wireless device that is one embodiment of the wireless device shown in FIG. 1.

FIG. 2 is a block diagram of an exemplary design of a wireless device 200 that is one embodiment of a wireless device 110 of FIG. 1. In this exemplary design, the wireless device 200 includes a transceiver 228 coupled to an antenna 222, and a data processor/controller 224. The transceiver 228 includes antenna interface circuit 254, a receiver path 230, and a transmitter path 240. Antenna interface circuit 254 may include switches, duplexers, transmit filters, receive filters, matching circuits, etc. The data processor/controller 224 may perform various functions for the wireless device 200. For example, the data processor/controller 224 may perform processing for data being received via the receiver path 230 and data being transmitted via the transmitter path 240. The data processor/controller 224 may control the operation of various circuits within the transceiver 228. Memory 226 may store program codes and data for the data processor/controller 224. The data processor/controller 224 may be implemented on one or more application specific integrated circuits (ASICs) and/or other integrated circuits (ICs). The receiver path 230 includes a low noise amplifier (LNA) 232, a mixer 234, a phase locked loop (PLL) 236, and a bandpass filter 238. An analog-to-digital converter (ADC) 250 is placed subsequent to the bandpass filter 238 to digitize the baseband signal. The transmitter path 240 includes a bandpass filter 248, a PLL 246, a mixer 244, a driver amplifier (DA) 254, and a power amplifier (PA) 242. A digital-to-analog converter (DAC) 252 is placed between the data processor/controller 224 and the bandpass filter 248 to convert the digital data to the analog baseband signal. In the illustrated embodiment of FIG. 2, the receiver path 230 includes PLL 236 and the transmitter path 240 includes PLL 246 to provide local oscillator signals to the mixer 234, 244. However, in other embodiments, both receiver path 230 and transmitter path 240 can use a single common PLL.

For data reception, antenna 222 receives signals from base stations and/or other transmitter stations and provides a received RF signal, which is routed through an antenna interface circuit 254 and presented as an input RF signal to the receiver path 230. The antenna interface circuit 254 may include switches, duplexers, transmit filters, receive filters, matching circuits, etc. Within the receiver path 230, the LNA 232 amplifies the input RF signal and provides an output RF signal to the mixer 234. The PLL 236 generates a local oscillator signal. The mixer 234 mixes the output RF signal with the PLL-generated local oscillator signal to downconvert the output RF signal from RF to baseband. The bandpass filter 238 filters the downconverted signal to provide an analog input signal to the ADC 250, which converts the analog input signal to the digital data and provides the digital data to the data processor/controller 224. The receiver path 230 may include other elements such as matching circuits, an oscillator, etc.

For data transmission, the data processor/controller 224 processes (e.g., encodes and modulates) data to be transmitted and provides a digital data to the DAC 252, which converts the digital data to an analog output signal and provides the converted analog output signal to the transmitter path 240, which generates a transmit RF signal. The transmit RF signal is routed through antenna interface circuit 254 and transmitted via antenna 222.

Figure 3:
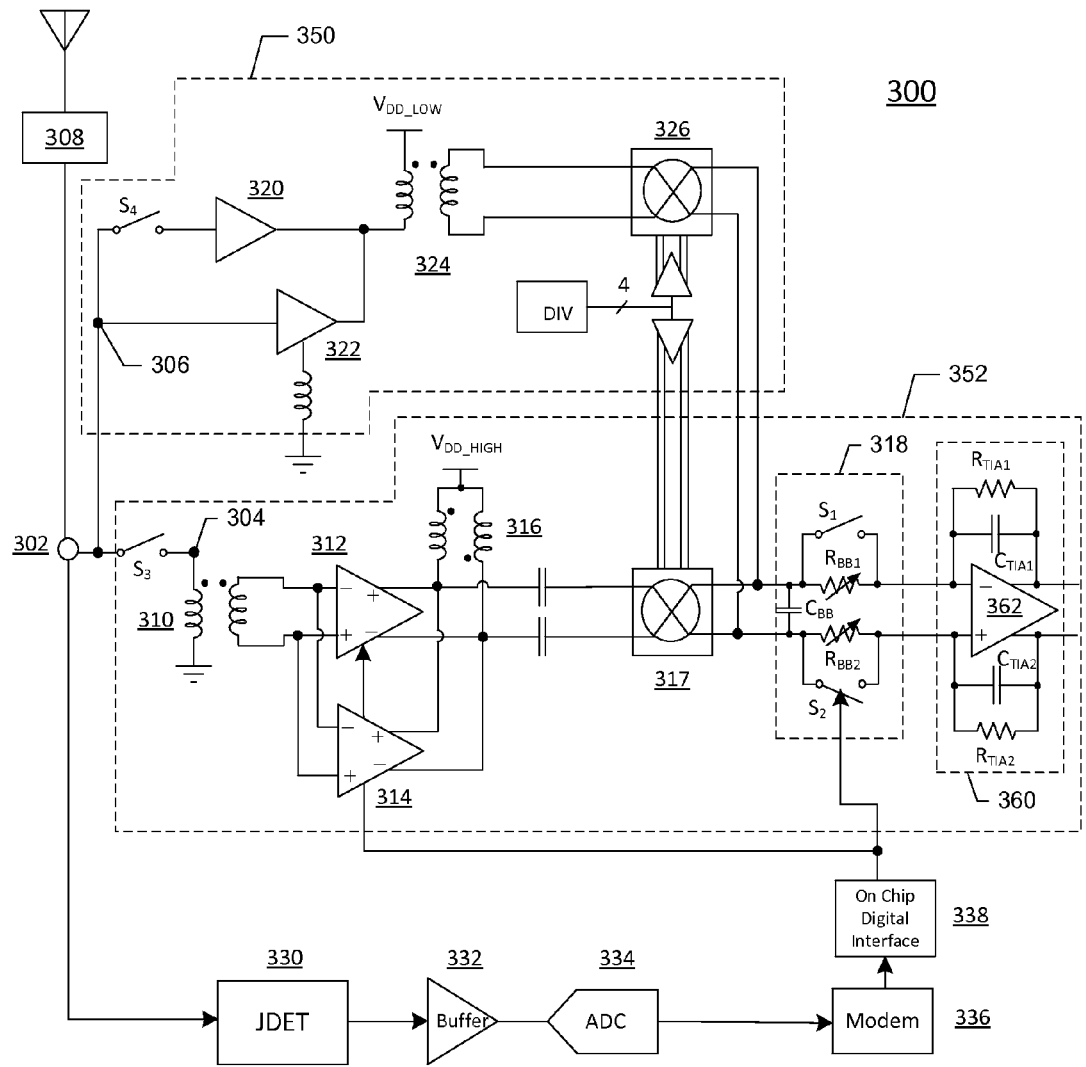
FIG. 3 is a schematic diagram of an exemplary receiver in accordance with one embodiment of the present disclosure.

FIG. 3 is a schematic diagram of an exemplary receiver 300 in accordance with one embodiment of the present disclosure. The receiver 300 is one embodiment of the receiver path 230, the antenna interface 254, and the antenna 222 of FIG. 2. In the illustrated embodiment of FIG. 3, the exemplary receiver 300 is configured to share "SAW" LNA (e.g., operating in FDD mode) and "SAW-less" LNA at input node 302. The "SAW" LNA is an LNA which requires an external filter such as a SAW filter for time division duplex (TDD) applications and a duplexer for FDD applications. Further, the "SAW-less" LNA is an LNA which requires no external SAW filter. In the illustrated embodiment of FIG. 3, the gain of the LNAs is programmable so that parameters such as gain and current bias can be dynamically programmed.

A SAW LNA can be implemented as a single-ended LNA with external input match. Single-ended LNA reduces pin count and saves current consumption as well as area. For SAW-less applications, often a differential LNA is required to meet stringent LNA IP2/IP3 requirements. Some solutions use a dedicated SAW-less differential LNA with two input pins and an external balun. Also, to meet linearity under 0 dBm blocking condition, the LNA is optimized such that it draws a lot of power from a high supply voltage. In order to simultaneously reduce the number of input pins, reduce the cost by removing the need for external balun, and use SAW and SAW-less LNAs on the same input pin, an on-chip input balun (which provides single-ended-to-differential conversion) can be used for each signal path. Thus, in one embodiment, the single-ended SAW amplifier is selected for better noise figure when the LNA linearity requirements (e.g., IIP2) are relaxed.

In the illustrated embodiment of FIG. 3, a single port shard input node 304 of the SAW-less path 352 connects to the input node 302 through switch S3 which couples to a first terminal of a primary winding of an internal balun 310. Thus, switch S3 isolates the loading of the SAW-less LNA to the SAW LNA. A second terminal of the primary winding couples to the ground. Terminals of the second winding of the internal balun 310 connect to the input terminals of the SAW-less differential amplifiers (e.g., SAW-less differential LNAs) 312, 314. The balun 310 performs single-ended-to-differential conversion. The internal balun 310 also enables reduction in pin-count and bill-of-material (BOM) savings (e.g., no external balun). Further the input balun 310 with a tunable capacitor (not shown in FIG. 3) achieves bandpass filtering for out-of-band (OOB) jammers.

In FIG. 3, the SAW-less path 352 includes a high linearity (HL) SAW-less LNA 312 and a low linearity (LL) SAW-less LNA 314 which are selectable. An HL LNA is designed to handle large jammers and achieve high linearity under OOB blocking conditions. An LL LNA is designed to give optimum noise figure when there are no OOB blockers present. In one embodiment, SAW-less LNA can be configured as a differential class AB LNA coupled to a high supply voltage through an RF choke 316. The differential mode is required to meet high LNA OOB IP2 for the jammers at the receiver. The high supply voltage can improve the input signal voltage swings and the linearity under 0 dBm OOB blocking conditions. The SAW-less path 352 further includes mixer 317 following the RF choke 316 to downconvert the RF signal to the baseband. Although the illustrated embodiment of FIG. 3 only shows two different linearity mode LNAs (i.e., HL and LL), in other embodiments, any number of linearity mode LNAs can be used. For example, a mid-linearity mode SAW-less LNA can be used in conjunction with HL and LL mode LNAs.

In one embodiment, the SAW filter provides approximately 25-30 dB rejection at 20 MHz offset and substantially reduces or eliminates all OOB interferers. However, when the SAW filter is eliminated (e.g., the SAW-less path 352 provided by LNAs 312, 314), the receiver is exposed to all OOB interferers with the closest interferer being 0 dBm at 20 MHz. This imposes huge filtering challenges on the receiver requirements including LNA compression/saturation, LNA linearity, mixer compression/linearity, and mixer IIP2. To filter the interferer/blocker at 20 MHz offset from LO (e.g., at 900 MHz), a very high Q filter is needed. For example, for 20 dB attenuation, Q of 450 is needed. In FIG. 3, the combination of mixer 317 with a low-pass filter 318 (sometimes referred to as an N-path filter) is configured to provide the high Q filtering. Further, an external input match circuit 308 with LO harmonic traps is designed at SAW-less LNA input to get better LO harmonics rejection. Thus the input match circuit 308 is configured as an LO harmonic rejection filter.

In the SAW-less path 352 shown in FIG. 3, since the passive mixer 317 has no reverse isolation, the mixer 317 up-converts baseband impedance to RF at around the LO frequency. At the output of the SAW-less LNA 312 or 314, pole/filtering at the baseband becomes high Q bandpass filter which can be used for blocker filtering. At a higher offset, 20 dB/decade roll-off flattens due to mixer switch resistance. Thus, this filter can be placed anywhere within the SAW-less path to get jammer filtering. Further, the filter automatically tracks the LO frequency and does not need tuning.

The SAW-less path 352 also includes a low pass filter 318 and a baseband processing block 360. The low pass filter 318 is configured with a capacitor (CBB) and at least one variable resistor (RBB1, RBB2) to tune and adjust a pole frequency based on high or low jammer condition. The baseband processing block 360 is configured with a transimpedance amplifier (TIA) 362, a pair of capacitors (CTIA1, CTIA2), and a pair of resistors (RTIA1, RTIA2) to process the filtered intermediate frequency signal. The combination of passive mixer 317 followed by a low pass filter 318 constitutes an "N-path" filter.

In the low pass filter 318, the capacitor (CBB) appears as a short at the jammer frequency at the LNA output. This reduces jammer swing at the LNA output and prevents LNA compression as well as mixer nonlinearity. The jammer swing is determined by the capacitor impedance and the mixer switch impedance. The jammer current flows through the mixer 317 and circulates through the capacitor (CBB). Resistors (RBB1, RBB2) block the jammer current going into the TIA 362 and prevents TIA saturation. Further, since the mixer operates in current mode, it can achieve high linearity under jammer conditions. Since input impedance of the TIA 362 also increases at 20 MHz, a combination of input impedance of the TIA 362 and resistors (RBB1, RBB2) should be greater than the impedance of the capacitor (CBB) for blocking jammer. The larger value of the resistor (RBB1, RBB2) increases the impedance looking into the mixer 317 from the summing junction of the TIA 362 and reduces baseband filter noise. The impedance of the balun or RF choke 316 should be large enough in comparison to the up-converted impedance of the resistor (RBB) plus the mixer so that the front end of the receiver has large transconductance (Gm). In one embodiment, in an LL mode, when there is no jammer, resistors RBB1, RBB2 are bypassed by activating the switches S1, S2, respectively. This helps to achieve higher front-end Gm and better sensitivity. In another embodiment, resistors RBB1, RBB2 are configured to be programmable so that the resistors can be adjusted to be any reasonable value rather than one set value or zero when shorted, depending on different jammer conditions.

RF OOB jammers pose a major problem for sawless receivers as they can instantly de-sensitize the receiver in the absence of a saw filter. Since these jammers can be present at different Rx frequencies, a wideband RF jammer detector (JDET) needs to be implemented at LNA input, in order to tell the Rx path that a jammer is present and LNA needs to be switched to high linearity (HL) mode from low linearity (LL) mode and vice versa.

The selection of the HL SAW-less LNA 312 or the LL SAW-less LNA 314 is based on the jammer conditions detected by a single-ended wideband RF jammer detector 330. For example, when the jammer detector 330 at the LNA input detects less than a set threshold of jamming signal, the detector 330 sends a signal to the ADC 334 through buffer 332 to generate an ADC code, which is sent to the digital interface selector 338 through modem 336 to select/enable the LL SAW-less LNA 314. In contrast, when the jammer detector 330 detects jamming signal greater than the set threshold, the detector 330 sends a signal to select/enable the HL SAW-less LNA 312. The generated ADC code can be used to estimate jammer strength digitally and even multiple JDET switching thresholds can be planned in software depending upon different jammer probabilities, geographical location, etc. LL SAW-less LNA is designed to achieve low noise figure and low current consumption. HL SAW-less LNA is designed to achieve high linearity under 0 dBm OOB blocking conditions. Further, using the HL SAW-less LNA 312 in a high linearity mode is designed to meet reasonable NF under 0 dBm jammer while meeting the sensitivity requirements. Also, the N-path filter including passive mixer 317 and low pass filter 318 gives and enables the N-path filter for additional OOB jammer rejection at LNA output and improves mixer linearity in HL mode. Further, different mixer gate voltage can be programmed to trade off mixer linearity vs NF based on jammer conditions. Also, different mixer IP2 calibration codes can be used in HL mode vs LL mode to optimize the second order nonlinearity performance of mixer via calibration.

The illustrated embodiment of FIG. 3 also includes shared input node 306 of the SAW path 350 which is a single-ended common-source degenerated LNA 320 or 322 (in other embodiments, any type of LNA can be used) with load balun 324. LNAs 320, 322 are optimized for NF, area and power. SAW LNA 320 is configured as a low-gain (LG) LNA that connects to shared input node 306 through switch S4, while SAW LNA 322 is configured as a high-gain (HG) LNA that couples directly to shared input node 306. Thus, switch S4 isolates the loading of LG SAW LNA to HG SAW LNA and SAW-less LNAs 312, 314. Since load balun 324 is configured as a load for the SAW LNA path, which requires external SAW filter, balun 324 can be operated with a low supply voltage. The SAW path 350 further includes mixer 326 following the load balun 324 to downconvert the RF signal to the baseband.

In one embodiment, when the SAW-less path 352 is selected for a TDD mode (i.e., the input node/ball 302 is coupled to the SAW-less path 352), the external input match circuit 308 is populated to work with an input balun 310 and a differential LNA 312 or 314. In another embodiment, when the SAW path 350 is selected for a TDD mode or connects to the duplexers for an FDD mode (i.e., the input node/ball 302 is coupled to the SAW path 350), the external input match circuit 308 is populated to work with a single-ended LNA 320 or 322. In contrast, implementing a SAW solution with a differential LNA would generate extra balun insertion loss, more power consumption, and occupy more area. Further, implementing a SAW-less solution with a single-ended LNA would not meet performance under 0 dBm jammer condition with a very high OOB IIP3. Thus, sharing the input node/ball 302 optimizes each individual LNA solution, without the cost of an extra ball.

Regarding the gain states, the HL SAW-less LNA 312 implements gain states G0HL, G1HL, G2HL, while the LL SAW-less LNA 314 implements gain states G0LL, G1LL, G2LL in a differential operation. Further, the SAW-less path 352 shares the LG SAW LNA 320 of the SAW path 350 for the gain states G3, G4, and G5 by turning switch S4 on and turning switch S3 off. These gain states (G3, G4, G5) are optimized to draw very little current in a single-ended operation at low supply voltage while meeting high linearity. Thus, SAW-less path reuses single-ended LG LNA 320 from SAW path and achieves area and power efficiency in low gain states.

Figure 4:
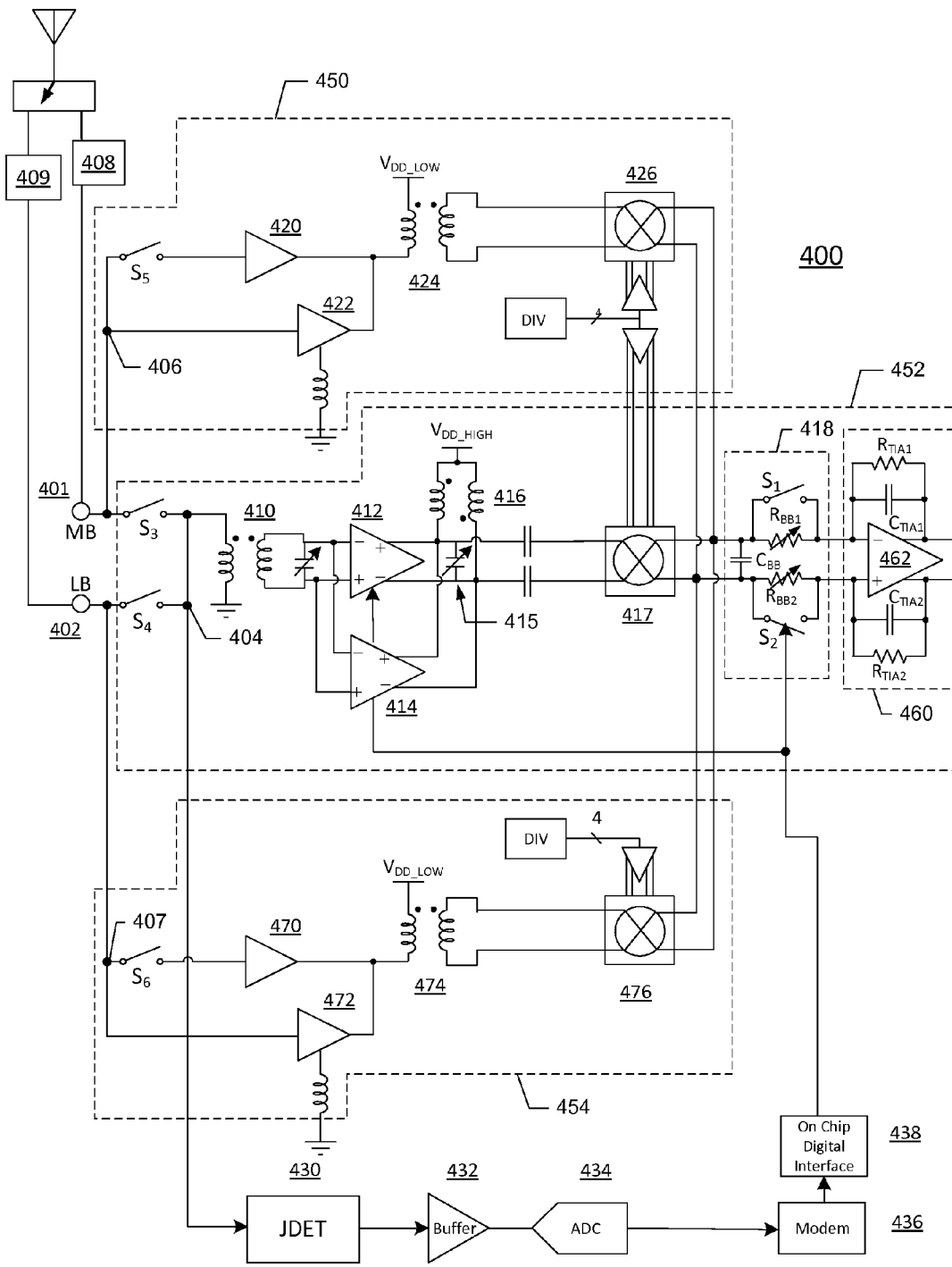
FIG. 4 is a schematic diagram of an exemplary receiver in accordance with another embodiment of the present disclosure.

FIG. 4 is a schematic diagram of an exemplary receiver 400 in accordance with another embodiment of the present disclosure. In one embodiment, the receiver 400 is used in the wireless device shown in FIG. 2 as receiver 230. In the illustrated embodiment of FIG. 4, the exemplary receiver 400 is configured to share the SAW-less path 452 between LB and MB ports, including an input balun 410, an HL SAW-less LNA 412, an LL SAW-less LNA 414, choke 416, and a mixer 417, with a mid-band (MB) SAW path 450 and a low-band (LB) SAW path 454 using switches S3 and S4, respectively. Radio frequency (RF) bands in the range of 600 MHz to 1 GHz are typically referred to as "LB", while bands in the range of 1.4 GHz to 2.3 GHz are referred to as "MB". Good isolation is achieved between LB and MB with switches S3 and S4. During SAW mode operation, switches S3 and S4 isolate SAW-less input balun loading the SAW path, which lowers the input impedance for the SAW path and degrades NF. Switches S3 and S4 experience a large jammer swing under 0 dBm jammer condition and are designed to have good off impedance while meeting high linearity.

In FIG. 4, the MB SAW path 450 couples to input ball 401 and the LB SAW path 454 couples to input ball 402. Each of the MB SAW path 450 and the LB SAW path 454 includes shared input node 406 or 407, a single-ended LG SAW LNA 420 or 470, a single-ended HG SAW LNA 422 or 472, a load balun 424 or 474, and a mixer 426 or 476. Switches S5 and S6 are used to share the SAW signal paths 450, 454 with the SAW-less signal path 452 for input balls 401, 402, respectively. A SAW-less balun 410, which is often large due to high linearity requirements in HL mode, is shared between the MB SAW path 450 and the LB SAW path 454. The self-resonance of this balun should be high enough to support the highest supported frequency of operation. Further, tunable capacitors 415 in the balun 410 can achieve input impedance tenability and bandpass filtering of OOB jammers for MB/LB signal frequencies. Although the illustrated embodiment of FIG. 4 shows only two bands (i.e., LB and MB), circuits for other bands such as a high-band circuit can be used to process the high-band signals.

An N-path filter (including mixer 417 and a low pass filter 418) and a baseband processing block 460 operate similarly to the N-path filter 317, 318 and the baseband processing block 360. A jammer detector 430, buffer 432, an ADC 434, modem 436, and a digital interface 438 also operate similarly to the jammer detector 330, buffer 332, the ADC 334, modem 336, and the digital interface selector 338. Further, external input match circuits 408, 409 operate similarly to the external input match circuit 308.

Most modern multi-band, multi-mode phones include several components on a board and often involve complex PCB routing. In some applications such as phones with Global Positioning System (GPS) or Rx diversity, a separate secondary antenna other than the primary antenna is used. Due to layout constraints and optimal reception, often, this secondary antenna is placed far from the primary antenna. As a result of this, the trace loss from the secondary antenna to the LNA input is too high. Hence, it is desirable to use an external LNA placed close to secondary antenna to mitigate NF degradation due to trace losses. One current configuration includes a setup which places a filter, an LNA, and another filter before the receiver. Another configuration is when the front-end (FE) loss is too high for the diversity receiver (DRx) supporting multiple frequency bands. Such a configuration (see FIG. 5A) includes a diversity antenna followed by an antenna switch, a SAW filter bank, another switch, an LNA, another switch, and another SAW filter bank. Since a SAW-less receiver can handle a higher jammer, the second filter bank after the LNA can be removed. Thus, a SAW-less receiver can be configured to provide reduced NF and current consumption by removing or bypassing certain elements on a chip based on field scenarios of jammers. In one embodiment, the removing or bypassing includes physically removing the elements. In another embodiment, the removing or bypassing includes using a switch to bypass the elements such as with switches S1 and S2 in FIG. 4. In one embodiment, a current biasing in the LNA is dynamically programmable based on the jammers.

Figure 5A:
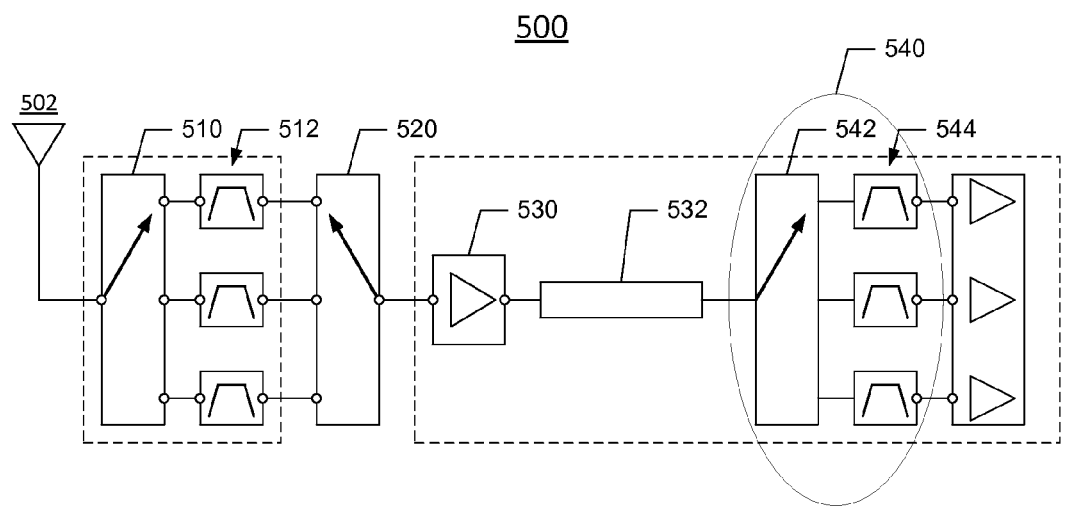
FIG. 5A is a block diagram of an exemplary apparatus in accordance with one embodiment of the present disclosure.
Figure 5B:
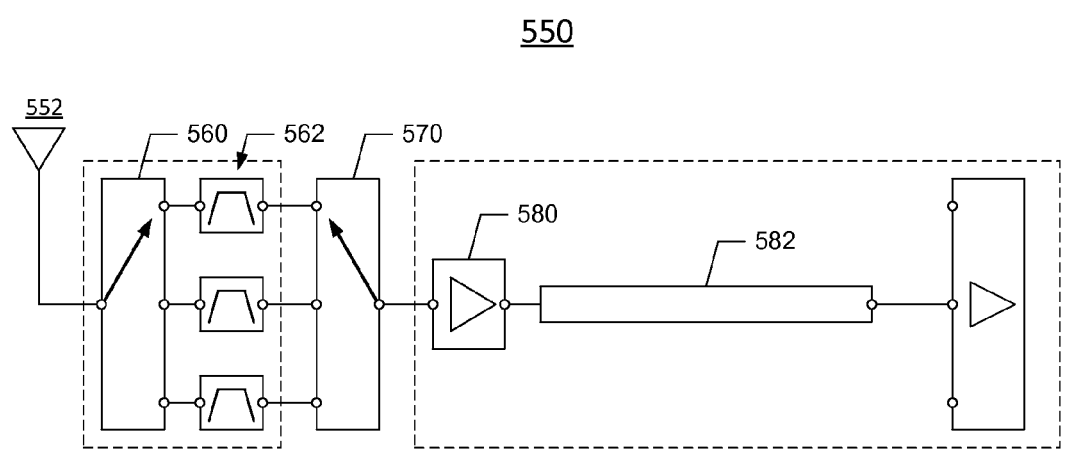
FIG. 5B is a block diagram of an exemplary apparatus with the above-mentioned elements removed in accordance with one embodiment of the present disclosure.

FIGS. 5A and 5B are block diagrams showing the advantages of embodiments shown in FIGS. 3 and 4. FIG. 5A is a block diagram of an exemplary receiver 500 which includes a diversity antenna 502 followed by an antenna switch 510, a first bank of filters 512, a first switch 520, an external (discrete) LNA 530, a second switch 542 and a second bank of filters 544. The first bank of filters 512 filters all OOB jammers and prevents desensitization of external LNA 530. The first switch 520 selects a filter from the first bank of filters 512 for the LNA 530. In one embodiment, an RF transmission line 532 connects the external LNA 530 with the second switch 542. However, since a SAW-less receiver (configured as shown in FIG. 3 or FIG. 4) can handle higher jammers (than a SAW receiver) gained up by LNA 530, the second switch 542 and the second bank of filters 544 (after the LNA 530) can be removed. FIG. 5B shows one example of the new configuration. For the sake of simplicity, the LNA input match between the SAW filter bank 544 in FIG. 5A and the LNA in the receiver is not shown.

FIG. 5B is a block diagram of an exemplary receiver 550 with the above-mentioned elements 540 removed in accordance with one embodiment of the present disclosure. In the illustrated embodiment of FIG. 5B, the receiver 550 includes a diversity antenna 552 followed by an antenna switch 560, a first filter bank 562, a first switch 570, and a SAW-less LNA 580, followed by an RF transmission line 582, which represents elements including a choke, a mixer, a capacitor, etc. Thus, the SAW-less receiver 550 of FIG. 5B, which can handle higher jammers (from Tx or adjacent bands) saves significant board area, lessens routing complexity, which leads to significant bill-of-material (BOM) savings due to the removal of switch 542 and the SAW filter bank 544. In FIG. 5A, the Tx leakage at the LNA input (after bank of filters 544) is often very high due to the gain in the external LNA 530. This requires the LNA to operate in lower gain states to avoid compression, hence degrading the NF. Since SAW-less LNAs can handle much higher jammers than SAW LNAs, a SAW-less LNA can operate in G0HL gain mode (e.g., as in FIG. 5B) and can offer better NF than SAW LNA in a low gain state. Also, the current consumption on a SAW-less LNA can be dynamically controlled or programmed using a controller (not shown in FIG. 5B) by detecting jammers (e.g., based on an output of JDET circuit 330 shown in FIG. 3). Under low jammer condition, LNA current can be reduced. Further, since the duty cycle when Rx is ON is much smaller, as compared to the total slots in GSM, the current consumption impact due to the differential SAW-less LNA is minimal. For the sake of simplicity, SAW-less LNA input match between the transmission line 582 and the LNA is not shown.

Figure 6:
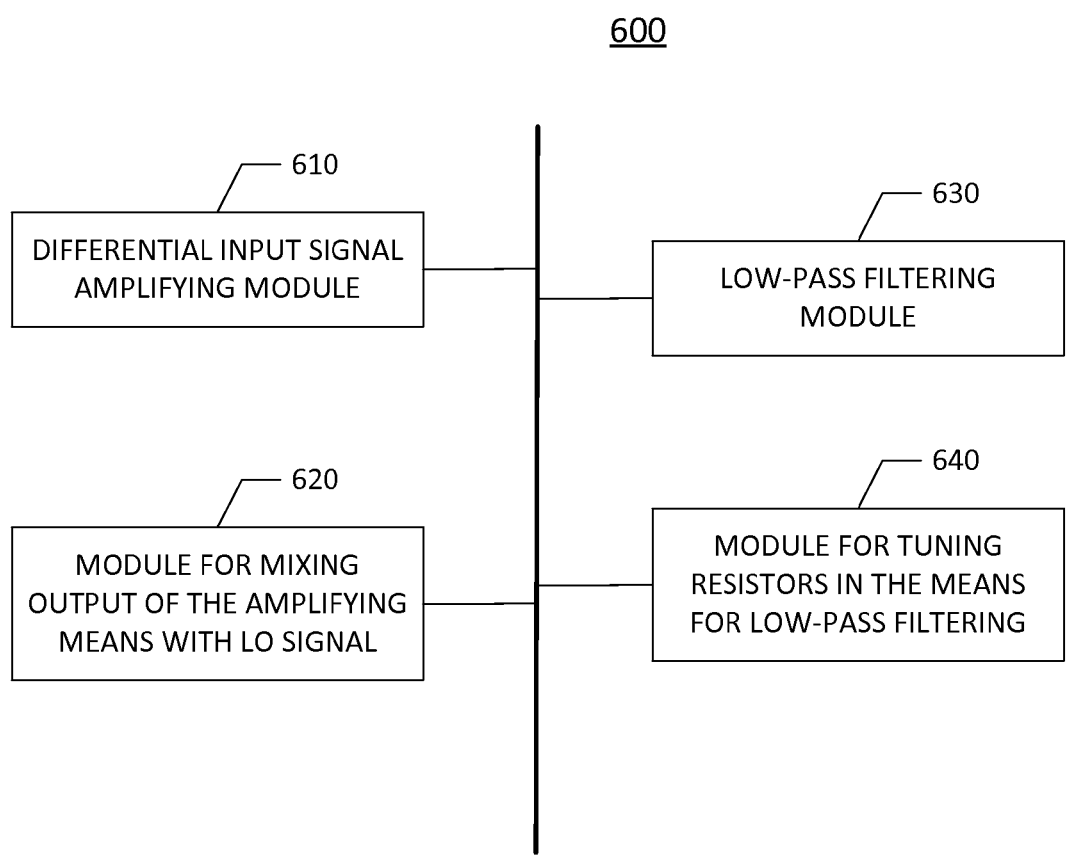
FIG. 6 is a functional block diagram of an exemplary apparatus configured for combining several different signal paths and reuse and/or share a SAW-less receiver with a SAW mode operation on the same pin in accordance with one embodiment of the present disclosure.

FIG. 6 is a functional block diagram of an exemplary apparatus 600 configured for combining several different signal paths and reuse and/or share a SAW-less receiver with a SAW mode operation on the same pin in accordance with one embodiment of the present disclosure. In the illustrated embodiment of FIG. 6, the apparatus 600 comprises a module for amplifying a differential input signal 610. The apparatus 600 also includes a module for mixing output of the amplifying means with LO signal 620, a module for low-pass filtering 630, and a module for tuning resistors 640 in the module for low-pass filtering.

Receiver chips and LNAs described herein may be implemented on an IC, an analog IC, an RF IC, a mixed-signal IC, an application specific integrated circuit (ASIC), a printed circuit board (PCB), an electronic device, etc. The receiver chips and LNAs may also be fabricated with various IC process technologies such as complementary metal oxide semiconductor (CMOS), N-channel MOS (NMOS), P-channel MOS (PMOS), bipolar junction transistor (BJT), bipolar-CMOS (BiCMOS), silicon germanium (SiGe), gallium arsenide (GaAs), hetero junction bipolar transistors (HBTs), high electron mobility transistors (HEMTs), silicon-on-insulator (SOI), etc.

An apparatus implementing the receiver chips and LNAs described herein may be a stand-alone device or may be part of a larger device. A device may be (i) a stand-alone IC, (ii) a set of one or more ICs that may include memory ICs for storing data and/or instructions, (iii) an RF IC such as an RF receiver (RFR) or an RF transmitter/receiver (RTR), (iv) an ASIC such as a mobile station modem (MSM), (v) a module that may be embedded within other devices, (vi) a receiver, cellular phone, wireless device, handset, or mobile unit, (vii) etc.

Although several embodiments of the invention are described above, many variations of the invention are possible. Further, features of the various embodiments may be combined in combinations that differ from those described above. Moreover, for clear and brief description, many descriptions of the systems and methods have been simplified. Many descriptions use terminology and structures of specific standards. However, the disclosed systems and methods are more broadly applicable.

Those of skill will appreciate that the various illustrative blocks and modules described in connection with the embodiments disclosed herein can be implemented in various forms. Some blocks and modules have been described above generally in terms of their functionality. How such functionality is implemented depends upon the design constraints imposed on an overall system. Skilled persons can implement the described functionality in varying ways for each particular application, but such implementation decisions should not be interpreted as causing a departure from the scope of the invention. In addition, the grouping of functions within a module, block, or step is for ease of description. Specific functions or steps can be moved from one module or block without departing from the invention.

The various illustrative logical blocks, units, steps, components, and modules described in connection with the embodiments disclosed herein can be implemented or performed with a processor, such as a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Further, circuits implementing the embodiments and functional blocks and modules described herein can be realized using various transistor types, logic families, and design methodologies.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent presently preferred embodiments of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. An apparatus comprising:
   at least one differential amplifier configured to amplify a radio frequency signal;
   a mixer configured to mix the radio frequency signal from the at least one differential amplifier with a local oscillator signal;
   a low-pass filter coupled to the mixer, the low-pass filter includes a capacitor and at least one variable resistor configured to tune the low-pass filter;
   at least one single-ended amplifier configured to operate in a surface acoustic wave (SAW) mode; and
   a shared input node coupled to the at least one differential amplifier and the at least one single-ended amplifier.

2. The apparatus of claim 1, further comprising
   at least one switch configured to bypass the at least one variable resistor.

3. The apparatus of claim 1, the at least one differential amplifier is configured to operate in a SAW-less mode.

4. The apparatus of claim 1, the at least one differential amplifier comprises a low linearity mode amplifier and a high linearity mode amplifier.

5. The apparatus of claim 4, further comprising:
   a selector configured to select one of the low linearity mode amplifier or the high linearity mode amplifier; and
   at least one switch coupled to the at least one variable resistor and configured to activate when the low linearity amplifier is selected.

6. The apparatus of claim 4, further comprising
   a detector configured to detect jammer conditions,
   the mixer and the low-pass filter are coupled to the low linearity mode amplifier and the high linearity mode amplifier, the mixer and the low-pass filter are configured to include a pole frequency which is adjustable based on the jammer conditions detected by the detector.

7. The apparatus of claim the at least one single-ended amplifier comprises a low gain SAW mode amplifier and a high gain SAW mode amplifier.

8. The apparatus of claim 7, the low gain SAW mode amplifier is configured to be used for a low gain SAW-less mode.

9. The apparatus of claim 1, further comprising
first and second switches coupled to the shared input node, the first switch is also coupled to the at least one differential amplifier and the second switch is also coupled to the least one single-ended amplifier.

10. The apparatus of claim 9, further comprising
an on-chip balun coupled between the at least one differential amplifier and the first switch.

11. The apparatus of claim 1, further comprising
an input matching circuit coupled to the shared input node and configured as a local oscillator harmonic rejection filter.

12. The apparatus of claim 1, further comprising
a switch coupled to the shared input node and configured to select the at least one single-ended amplifier when linearity requirements are relaxed.

13. The apparatus of claim 1, further comprising
a detector configured to detect jammer conditions,
the at least one differential amplifier includes at least one SAW-less amplifier configured to operate under high jammer conditions.

14. The apparatus of claim 13, further comprising
a controller configured to control current consumption of the at least one SAW-less amplifier based on the jammer conditions.

15. An apparatus comprising:
at least one differential amplifier configured to amplify a radio frequency signal;
a mixer configured to mix the radio frequency signal from the at least one differential amplifier with a local oscillator signal;
a low-pass filter coupled to the mixer, the low-pass filter includes a capacitor and at least one variable resistor configured to tune the low-pass filter;
a first surface acoustic wave (SAW) path and a second SAW path; and
a first shared input node and a second shared input node, the first shared input node is coupled to one of the first SAW path or the at least one differential amplifier, and the second shared input node is coupled to one of the second SAW path or the at least one differential amplifier.

16. The apparatus of claim 15, the first SAW path comprises at least one single-ended amplifier configured as at least one low-band amplifier.

17. The apparatus of claim 16, the at least one low-band amplifier comprises a low-gain, low-band amplifier and a high-gain, low-band amplifier.

18. The apparatus of claim 17, further comprising
a switch disposed between the first shared input node and the low-gain, low-band amplifier.

19. The apparatus of claim 15, the second SAW path comprises at least one single-ended amplifier configured as at least one mid-band amplifier.

20. An apparatus comprising:
means for amplifying a radio frequency differential input signal;
means for mixing the amplified radio frequency differential input signal with a local oscillator signal;
means for low-pass filtering coupled to the means for mixing,
wherein means for low-pass filtering includes means for tuning the means for low-pass filtering,
wherein the means for tuning includes means for varying resistance and means for providing capacitance;
means for single-ended amplifying and operating in a surface acoustic wave (SAW) mode; and
means for providing a shared input to the means for amplifying and the means for single-ended amplifying.

21. The apparatus of claim 20, further comprising
means for bypassing the means for varying resistance.

* * * * *